(12) United States Patent
Blonder

(10) Patent No.: US 7,112,362 B2
(45) Date of Patent: Sep. 26, 2006

(54) THERMALLY MOVABLE PLASTIC DEVICES AND TOYS

(76) Inventor: Greg E. Blonder, 129 Woodland Ave., Summit, NJ (US) 07901

( * ) Notice: Subject to any disclaimer, the term of this patent is extended or adjusted under 35 U.S.C. 154(b) by 0 days.

(21) Appl. No.: 10/378,510

(22) Filed: Mar. 3, 2003

(65) Prior Publication Data

US 2003/0161972 A1 Aug. 28, 2003

Related U.S. Application Data

(62) Division of application No. 09/934,744, filed on Aug. 22, 2001, now abandoned.

(51) Int. Cl.
*A63H 33/00* (2006.01)
*H01H 61/00* (2006.01)
*H01H 61/04* (2006.01)
*H01H 33/00* (2006.01)
*B32B 7/02* (2006.01)

(52) U.S. Cl. .......... 428/212; 428/913; 446/14; 446/385; 337/16; 337/27; 337/36; 337/85; 337/107; 337/111; 337/333; 337/362; 337/379

(58) Field of Classification Search ......... 446/14, 446/491, 140, 176, 267, 385; 40/406; 434/300; 428/913, 212; 337/16, 27, 36, 85, 107, 111, 337/333, 362, 379, 11
See application file for complete search history.

(56) References Cited

U.S. PATENT DOCUMENTS

| | | | |
|---|---|---|---|
| 2,561,217 A | 7/1951 | Muir | |
| 3,436,016 A | 4/1969 | Edwards | |
| 4,109,851 A | 8/1978 | Goates | |
| 4,243,175 A | 1/1981 | McSwain | |
| 4,290,554 A | 9/1981 | Hensley | |
| 4,530,440 A | 7/1985 | Leong | |
| 4,764,140 A | 8/1988 | Wood | |
| 4,881,915 A | 11/1989 | Liaw | |
| 4,962,882 A | 10/1990 | Sarazen, Jr. et al. | |
| 5,022,884 A * | 6/1991 | Hippely et al. | ............... 446/14 |
| 5,176,275 A | 1/1993 | Bowie | |
| 5,316,777 A | 5/1994 | Toyoda et al. | |
| 5,346,421 A | 9/1994 | Yeh | |
| 5,428,209 A | 6/1995 | Babu et al. | |
| 5,503,583 A * | 4/1996 | Hippely et al. | ............... 446/14 |
| 5,518,433 A | 5/1996 | Sneddon | |
| 5,631,068 A | 5/1997 | Smith | |
| 5,687,497 A | 11/1997 | Moore | |
| 5,713,664 A | 2/1998 | Harilela | |
| 5,720,555 A | 2/1998 | Elele | |
| 5,770,283 A | 6/1998 | Gosselin et al. | |
| 5,798,169 A | 8/1998 | Smith | |
| 5,928,803 A | 7/1999 | Yasuda | |
| 5,984,196 A | 11/1999 | Godsey et al. | |
| 6,012,959 A | 1/2000 | Blonder | |
| 6,047,878 A | 4/2000 | Lowry | |
| 6,161,720 A | 12/2000 | Castle | |
| 6,196,895 B1 * | 3/2001 | Elkins | ............... 446/491 |
| 6,210,724 B1 | 4/2001 | Clarke et al. | |

FOREIGN PATENT DOCUMENTS

| | | |
|---|---|---|
| JP | 09-267422 | 10/1997 |
| JP | 409267422 A | 11/1997 |

* cited by examiner

*Primary Examiner*—Rena Dye
*Assistant Examiner*—Lawrence Ferguson
(74) *Attorney, Agent, or Firm*—Lowenstein Sandler PC

(57) ABSTRACT

In accordance with the invention, thin bodies of plastic, such as sheets or strands, with substantially different thermal coefficients of expansion are laminated together to make plastic bodies which move in response to heat. The movable plastic bodies can be secured to a suitable base to make a variety of devices for amusement, temperature monitoring and display. Applications for amusement include a thermally blooming flower, a solar activated butterfly, and curling hair for a doll. Applications for temperature monitoring include safety lids for drinking cups, sunlight blockers and ventilators.

1 Claim, 13 Drawing Sheets

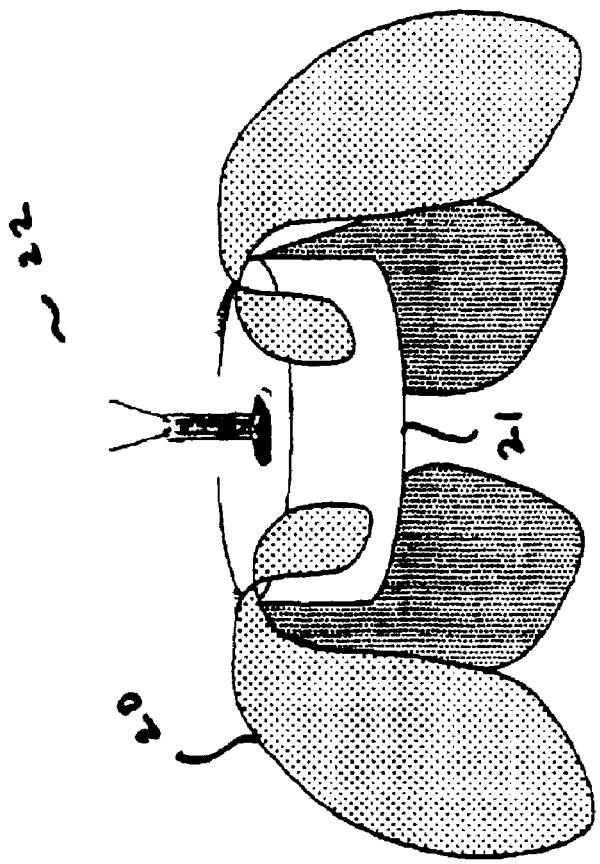
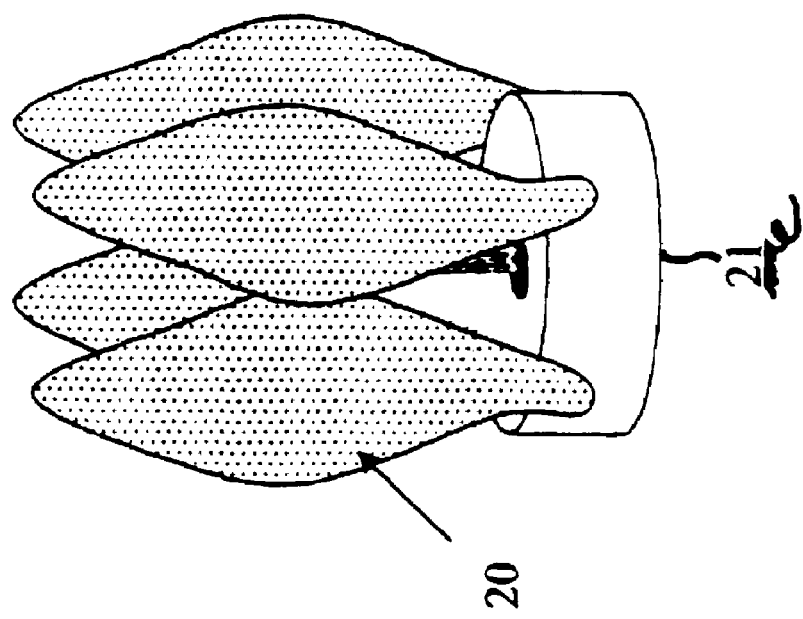
FIG. 2B (On)
FIG. 2A (Off)

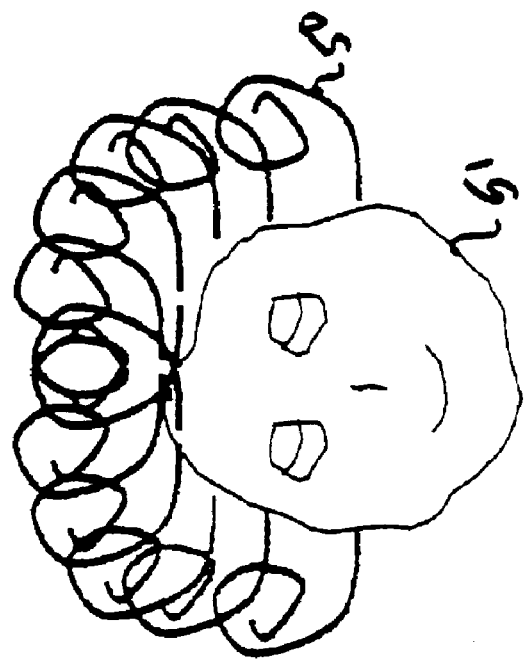
FIG. 5B (hot)
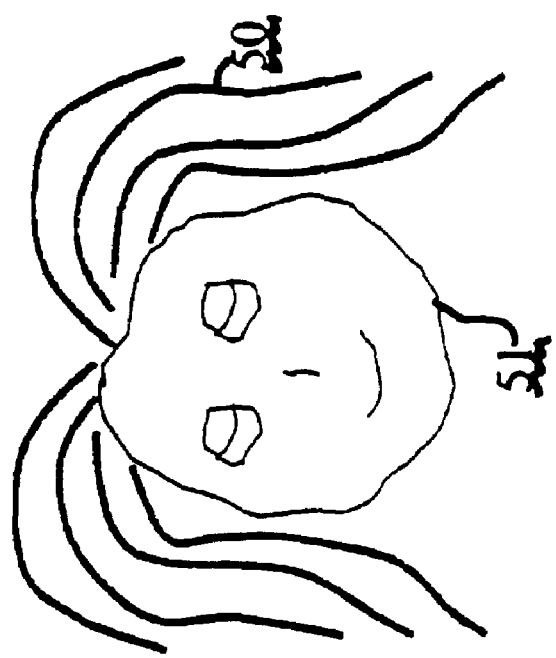
FIG. 5A (cold)

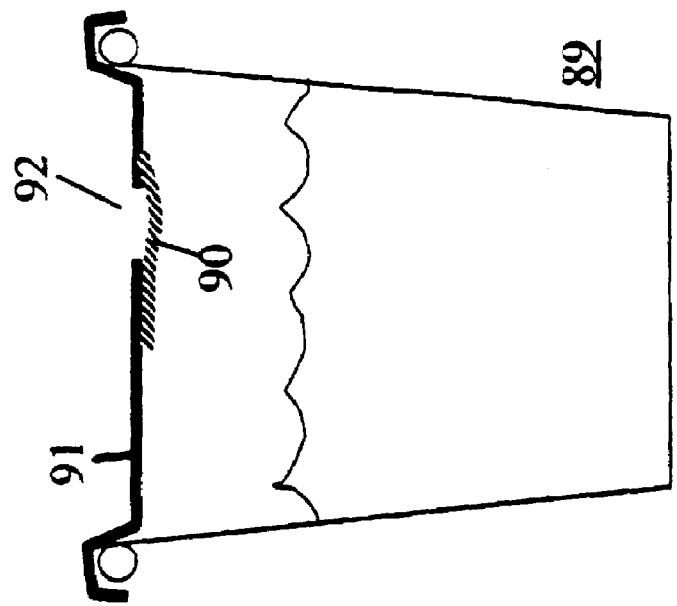
FIG 9B (hot)
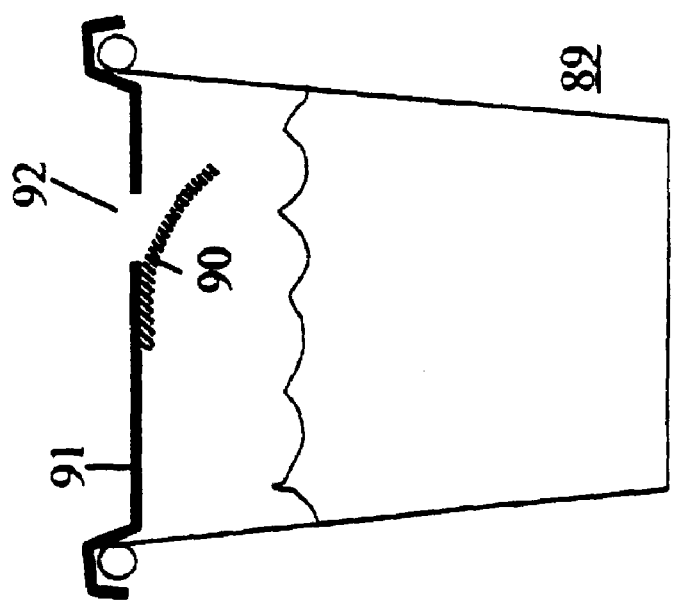
FIG. 9A (tepid)

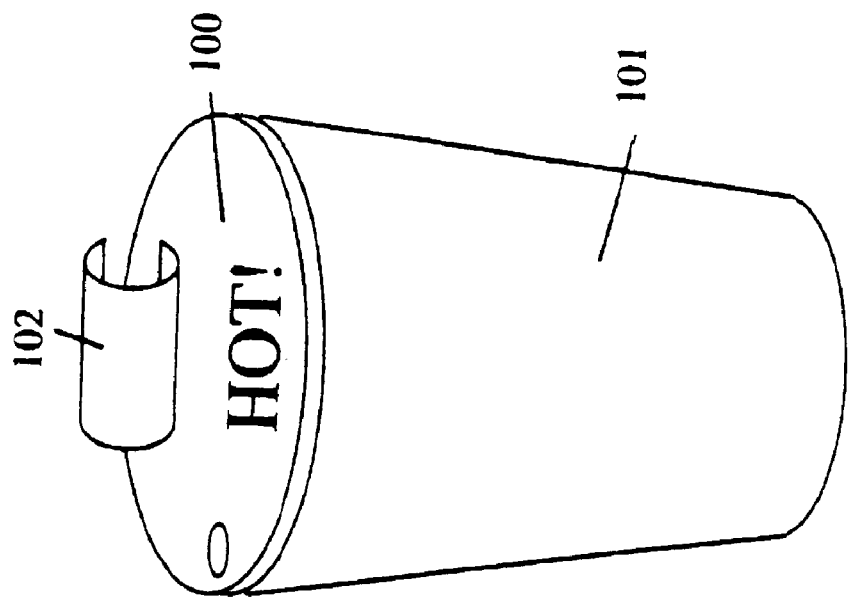
FIG. 10B (hot)
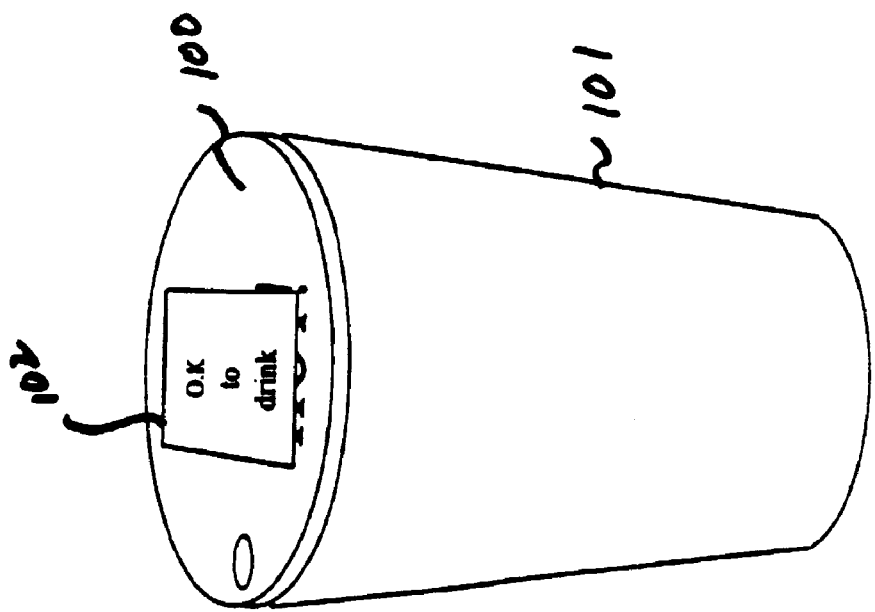
FIG. 10A (tepid)

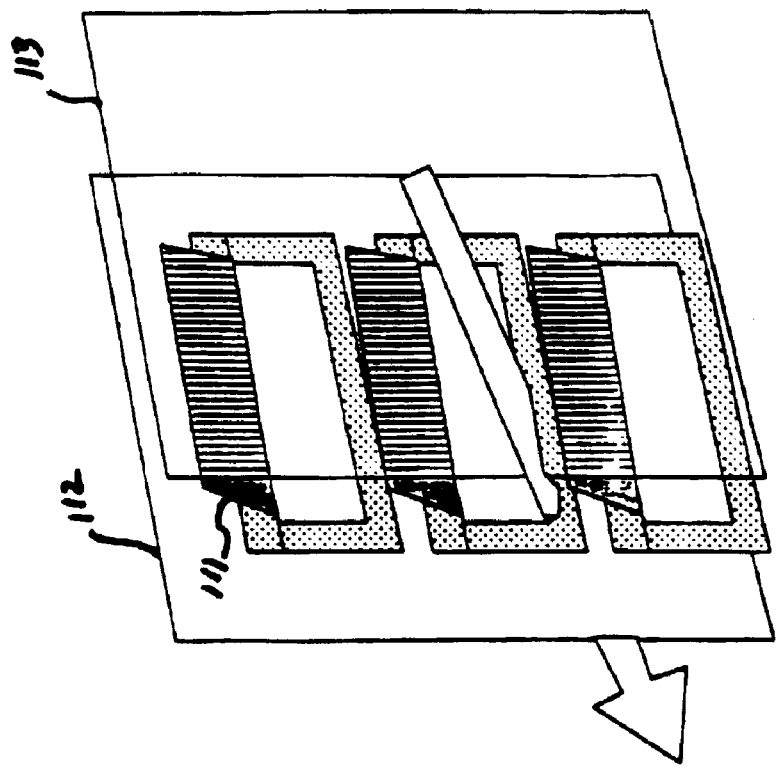
FIG. 11B (cold)
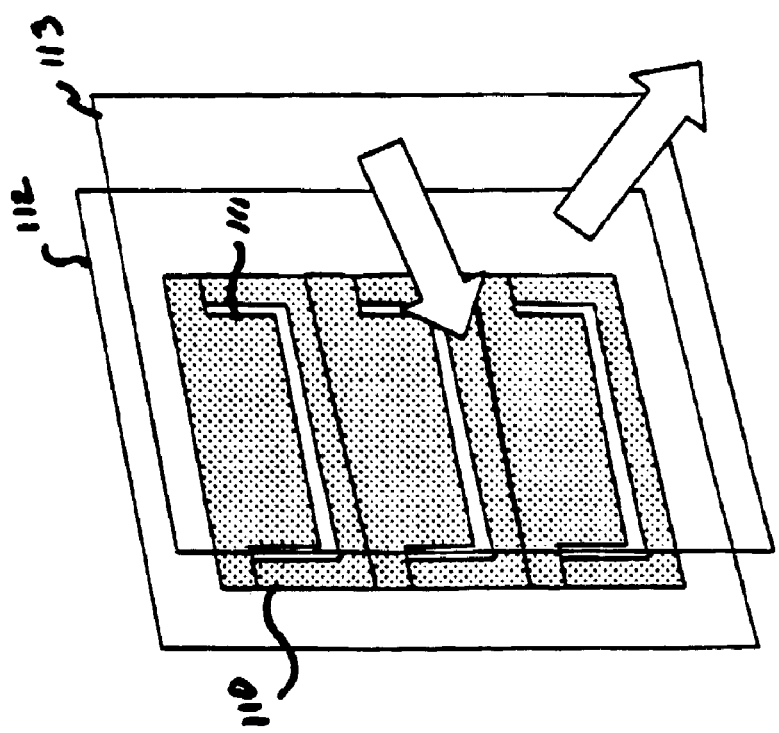
FIG. 11A (hot)

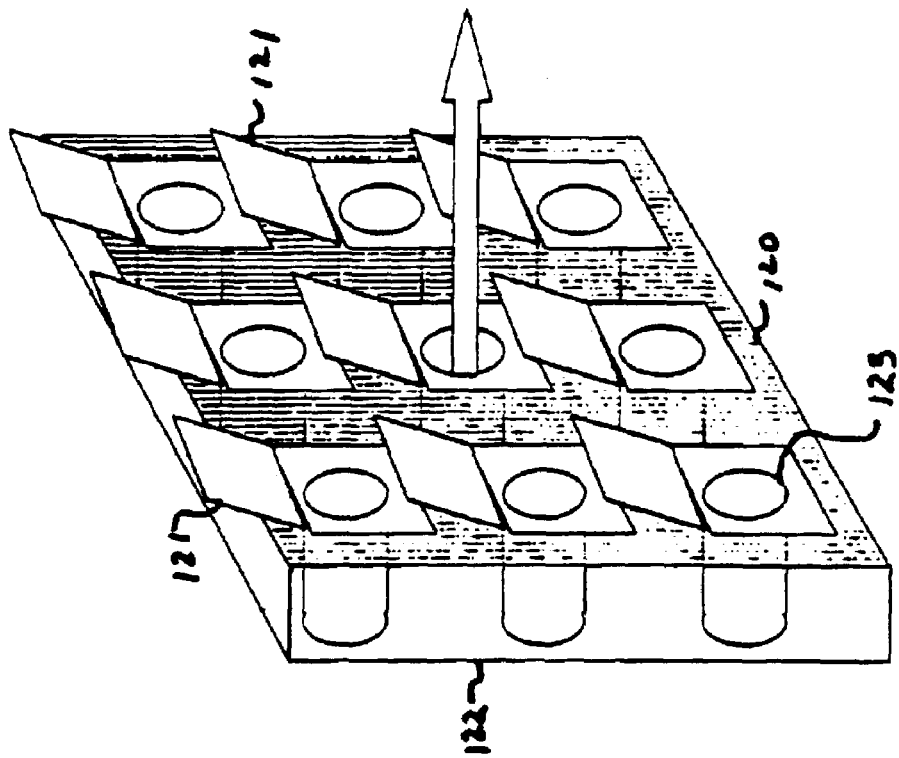
FIG. 12B (hot)
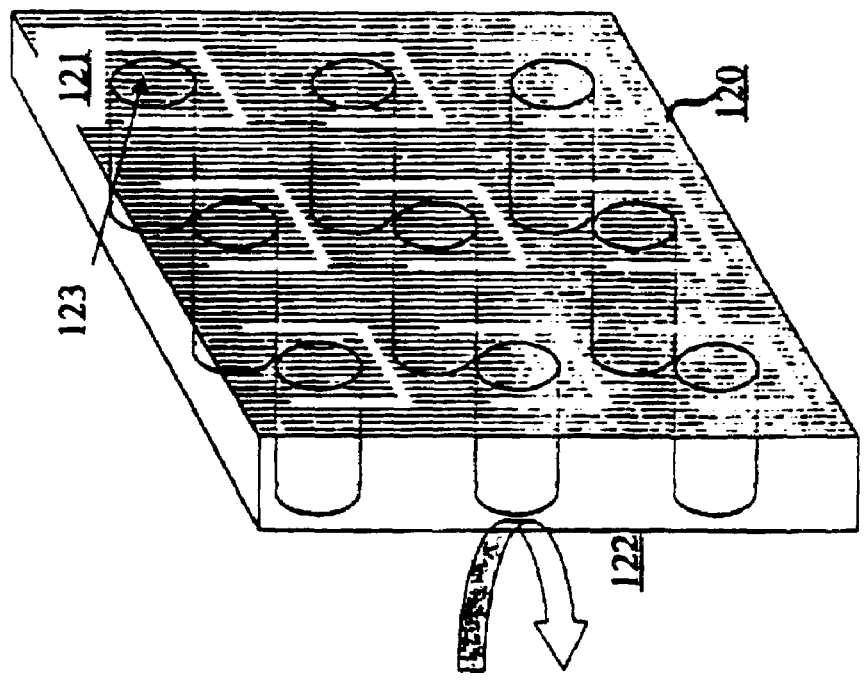
FIG. 12A (cold)

THERMALLY MOVABLE PLASTIC DEVICES AND TOYS

This is a divisional of Ser. No. 09/934,744, filed Aug. 22, 2001, which is now abandoned.

FIELD OF THE INVENTION

This invention relates to plastic devices, and in particular, to plastic devices which move in response to heat.

BACKGROUND OF THE INVENTION

It is well known that if two thin strips of metal having different thermal coefficients of expansion are laminated together, they will bend and straighten in a manner dependent on the temperature. This movement is because changes in temperature cause one strip to lengthen more than the other. Since both strips are bonded together, the only way this length difference can be accommodated is by curling. The standard equation for the bending of a bimetallic strip is:

$$D = K(DT)(De)L^2/t \qquad (\text{Eq.1})$$

where D is the distance the strip bends measured at the end of the strip, (DT) is the temperature difference relative to the temperature when the two layers were bonded, (De) is the thermal expansion difference, L is the length of the strip, t is the thickness, and K is a constant. Bimetallic strips are useful as thermometers and oven safety locks.

SUMMARY OF THE INVENTION

In accordance with the invention, thin bodies of plastic, such as sheets or strands, with substantially different thermal coefficients of expansion are laminated together to make plastic bodies which move in response to heat. The movable plastic bodies can be secured to a suitable base to make a variety of devices for amusement, temperature monitoring and display. Applications for amusement include a thermally blooming flower, a solar activated butterfly, and curling hair for a doll. Applications for temperature monitoring include safety lids for drinking cups, sunlight blockers and ventilators.

BRIEF DESCRIPTION OF THE DRAWINGS

The advantages, nature and various additional features of the invention will appear more fully upon consideration of the illustrative embodiments now to be described in detail in connection with the accompanying drawings. In the drawings:

FIGS. 2–7 illustrate thermally movable plastic devices for amusement;

FIGS. 8–12 illustrate thermally movable plastic devices for temperature monitoring and control.

It is to be understood that these drawings are for purposes of illustrating the concepts of the invention and are not to scale.

DETAILED DESCRIPTION

This disclosure is divided into four parts: Part I describes thermally movable plastic bodies; Part II describes thermally movable plastic devices for amusement; Part III describes such devices for temperature monitoring applications; and Part IV describes devices for display applications.

I. Thermally Movable Plastics

Figure 1:
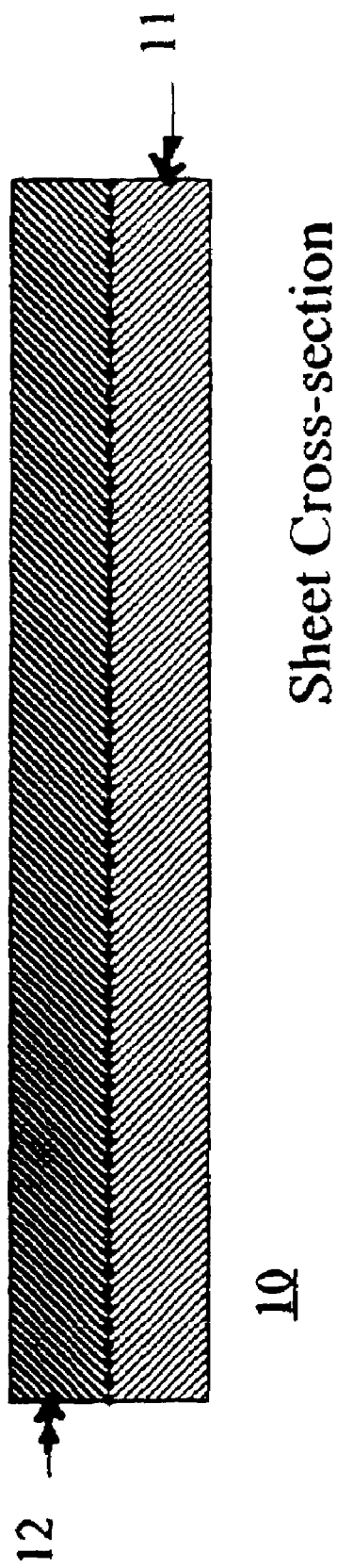
FIG. 1 is a schematic cross section of a thermally movable plastic sheet.

Referring to the drawings, FIG. 1 is a schematic cross section of a thermally movable plastic body comprising a sheet 10. The sheet 10 in its simplest form comprises two laminated sheets 11 and 12 of plastic having respective coefficients of thermal expansion which differ by more than about $1 \times 10^{-5}$. Typical materials are polyethylene (thermal expansion coefficient about $8 \times 10^{-5}/F$) and polyvinyl chloride (PVC) (expansion coefficient about $3 \times 10^{-5}/F$). Typical thicknesses for each component layer vary from 1 to 10 mils.

The bending of the laminated sheet 10 follows the bimetallic strip bending equation (Eq.1), so thinner layers and materials with a large difference in expansion coefficient show the greatest heat induced movement. Plastics typically have larger coefficients (by a factor of 10) than most metals, providing a higher level of thermal sensitivity. Moreover plastics are inexpensively available in a wide range of colors, including clear, permitting a wide range of aesthetic effects.

The curling direction of sheet 11 can be controlled in a number of ways. In general, the sheet will bend away from the layer with the greater expansion coefficient. Some plastics such as polyethylene, exhibit biaxial expansion coefficients that differ in two directions. Biaxial expansion can result from stretching the plastic during manufacture, from inclusion of aligned, low-expansion fillers such as glass fibers, or from grooves or raised lines in the film. In general, the sheet 10 will curl along the direction of higher expansion coefficient. Depending on the shape of the film relative to the curl direction, a spiral can result upon heating.

The amount of curling is generally linear with temperature. The displacement D doubles with a doubling in the temperature difference (DT). A non-linear displacement can be achieved by preshaping the sheet 10 into an arc perpendicular to the direction of thermal curl. When heated, the sheet tries to expand and curl, but first must overcome the spring forces created by the initial arc. Once the temperature rise creates enough force, the sheet snaps open into a strong curl. Such preshaped sheets are useful, for example, in controlling valves to be open or closed at a particular temperature. Alternatively, nonlinear curling can be obtained by attaching a weight or small magnet to one end of the sheet. The sheet will not move until enough force is generated to overcome the weight or magnet.

Sheet 10 can be fabricated by any of a number of conventional laminating techniques. For example layers 11 and 12 can be bonded with a pressure sensitive adhesive such as a two-part epoxy. This has the advantage of room temperature fabrication. For example, PVC tape can be bonded to polyethylene sheets. Alternatively, the sheets can be attached together with heat or light sensitive adhesives.

The sheets 11 and 12 need not be chemically different polymers. Polyethylene, for example, exhibits a factor of five difference in expansion coefficient between low and high molecular weight versions. Thus sheet 10 could comprise low and high molecular weight polyethylene. It is even possible to dispense with Lamination by spraying a crosslinking agent on only one surface of a low or middle-weight sheet, relying on the reaction of the agent through only a portion of the thickness to increase molecular weight on only one side and thus produce a thermally movable sheet.

The movable plastic bodies can also be formed as thin strips or strands. Strips can be made by forming sheets as described above and cutting them into narrow strips. Alternatively, heat movable strands can be made by co-injecting the two kinds of plastic through one nozzle, thereby ejecting a heat movable strand or fiber bilayer.

These thermally movable plastic sheets and strands can be used in a wide variety of applications. In general, the plastic is secured to a relatively rigid base, and the affect and application of the sheet depends upon the nature of the base.

II. Toy Applications

A. Blooming Flower

FIGS. 2A and 2B illustrate a device for amusement comprising a plurality of elongated oval (leaf shaped) pieces 20 of heat movable plastic secured around a common base 21 around a heat source 22 such as a low wattage light bulb. The pieces 20 can have one color on the underside, e.g. green, and another color on the top, e.g. red. The pieces 20 can comprise 2 mil polyethylene laminated to 2 mil PVC and the heat source can be a 7 watt bulb.

In use, the device behaves as a blooming flower. The pieces 20 can be oriented and arranged so that when the power of OFF, the pieces 20 curl around source 22, shielding it from view. This is illustrated in FIG. 2A. When the power is ON, heat from the source 22 causes the pieces 20 to curl away from the source, and the flower appears to bloom. This is depicted in FIG. 2B. The side of the leaf facing the source is preferably dark to absorb as much heat as possible.

B. Butterfly

Figure 3B:
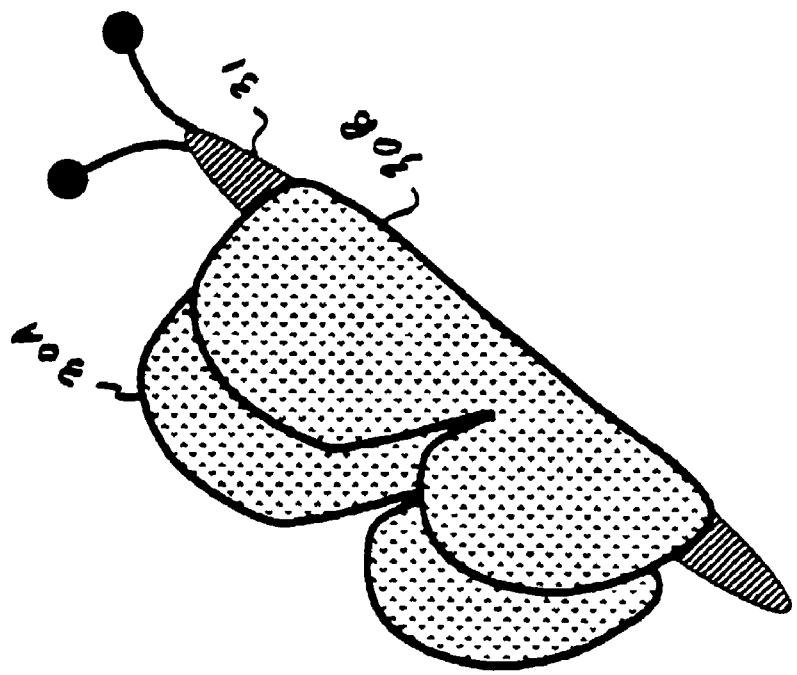
Figure 3A:
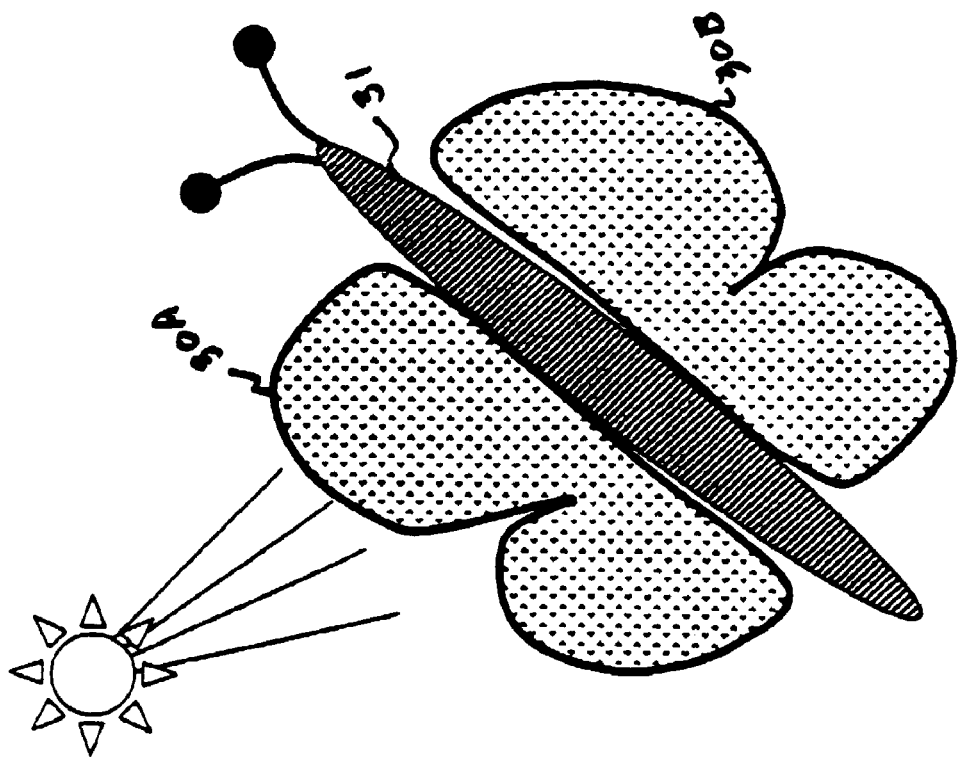

FIGS. 3A and 3B depict a device to simulate a flying creature comprising a pair of generally oval pieces 30A and 30B of heat movable plastic secured on opposite sides of a generally cylindrical base 31. Advantageously 30A and 30B, in the flat condition, are sandwiched together, concealing the top surface. This is shown in FIG. 3B. In the curled condition shown in FIG. 3A, the wings open and the top surfaces are revealed. The pieces 30A and 30B can be imprinted on the top with a colorful pattern, such as that of a Monarch butterfly, and the body 31 can present a fuzzy texture such as that of a pipe cleaner.

In use, the device behaves as a butterfly. The pieces 30A and 30B can be oriented and arranged so that sunlight striking them causes them to open up like the wings of a butterfly. Animation can be achieved by providing a variable source of heat (not shown) such as an electrically powered heat source that cycles ON and OFF.

C. Opening Pyramid

Figure 4B:
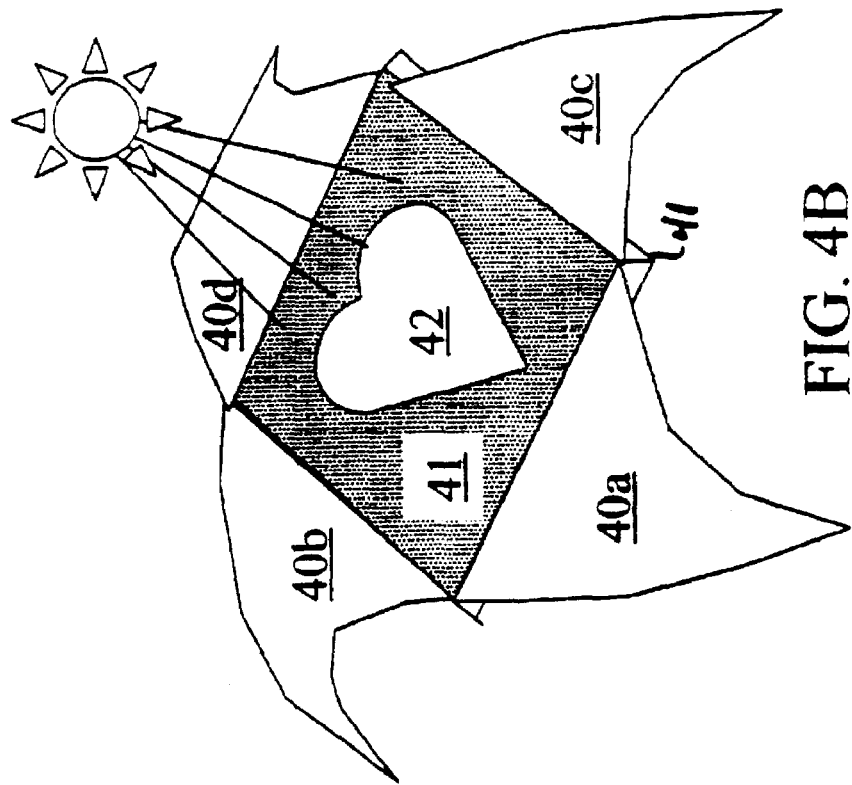
Figure 4A:
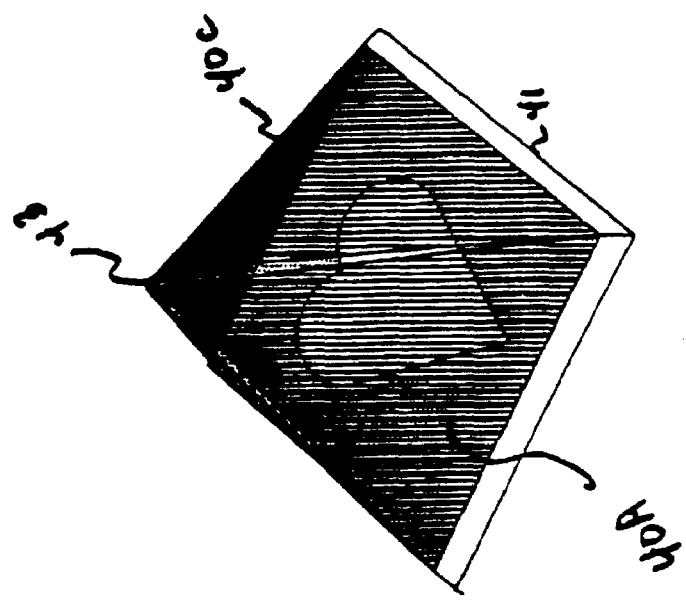

FIGS. 4A and 4B show a device comprising a plurality of triangular pieces (40A–40D) of heat movable plastic with respective sides secured to sides of a polygonal base 41. The base 41 can include a display object 42. In the flat condition shown in FIG. 4A, the pieces 4DA–40D can come together in a common apex 43 to form a closed pyramid, concealing the display object 42. In the curled condition (FIG. 4B), the pieces open up, revealing the object 42. Optional struts (not shown) could be provided to assist alignment of the flat condition pieces. Suitable display objects could include imitation Egyptian artifacts or attractive minerals (not shown).

D. Curling Doll Hair

FIGS. 5A and 5B illustrate a device comprising a plurality of thin strips or strands 50 of heat movable plastic secured to an area on a generally ellipsoidal (head shaped) base 51. In the flat condition (FIG. 5A), the thin strips behave as flexible strands. In the curled condition (FIG. 5B), the strips or strands 50 behave as curled strands.

In use as doll hair, the strips or strands 50 can be oriented so that they will normally be curled. However, if placed under running cold water, the strands will straighten for grooming and styling. Upon drying they will revert to their curled state.

Strips can be made by cutting heat movable plastic sheets. Alternatively heat movable strands can be made by co-injecting two kinds of plastic through one nozzle, thus ejecting a bi-layer heat movable fiber.

E. Solar Motor

Figure 6B:
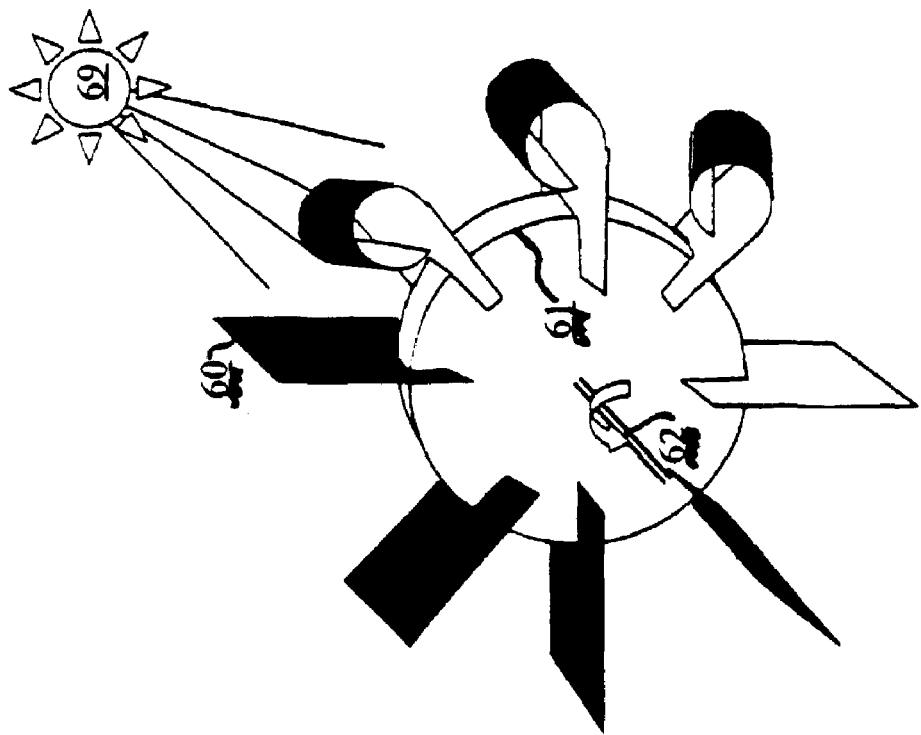
Figure 6A:
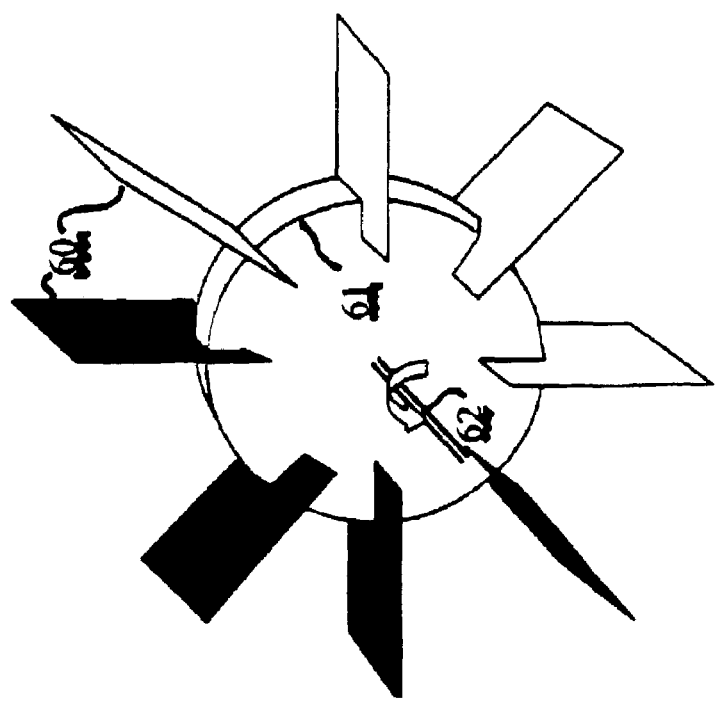

FIGS. 6A and 6B show a device comprising a plurality of strips 60 of heat movable plastic secured around the circumference of a circular ring or cylinder 61. The ring 61 is advantageously clear plastic and can be mounted to freely rotate on a central axle 62. In the flat condition, the strips 60 extend radially outward from the ring. In the curled condition (FIG. 6B), the strips bend radially inward.

In operation, the devices behaves as a solar motor When sunlight 69 strikes the ring, the exposed strips 60 bend, shifting the center of mass of the ring 61. The ring then rotates to bring the new center of mass under the axle 62. This movement, in turn, exposes a different set of strips to the sunlight. The cycle repeats, causing the ring to rotate continuously.

F. Artificial Plant Stems

Figure 7B:
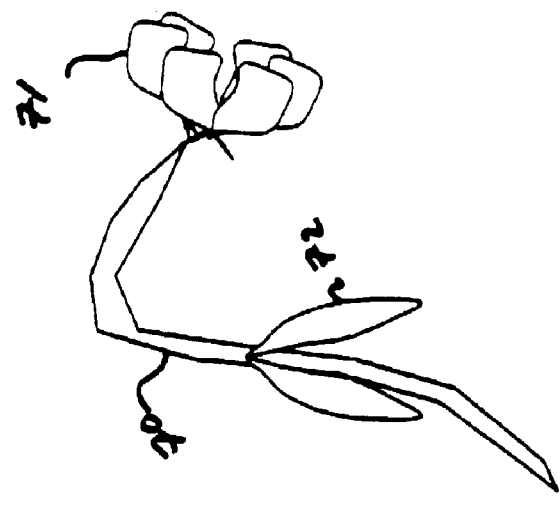
Figure 7A:
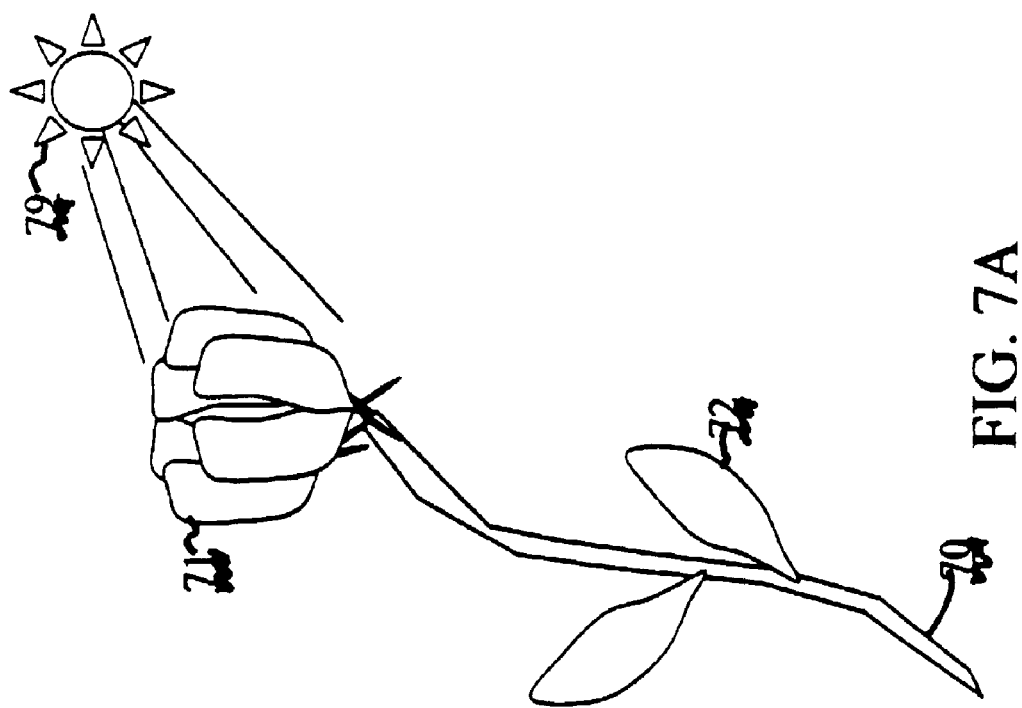

FIGS. 7A and 7B depict a device comprising a thick strip or strand 70 of movable plastic having artificial flowers 71 and/or artificial leaves 72 secured to it. The strip or strand 70 is advantageously colored green and shaped to appear as an artificial plant stem. Advantageously, the artificial flowers and artificial leaves can also be made of thermally movable plastic.

In operation, the stem 70 behaves as a phototropic plant, moving from one position (FIG. 7A) to another (FIG. 7B) in response to sunlight. It can be oriented to follow the sun. The flowers 71 can bloom in the sun, and the leaves 72 can curl in the absence of light.

III. Temperature Monitoring Applications

A. Thermometer

Figure 8:
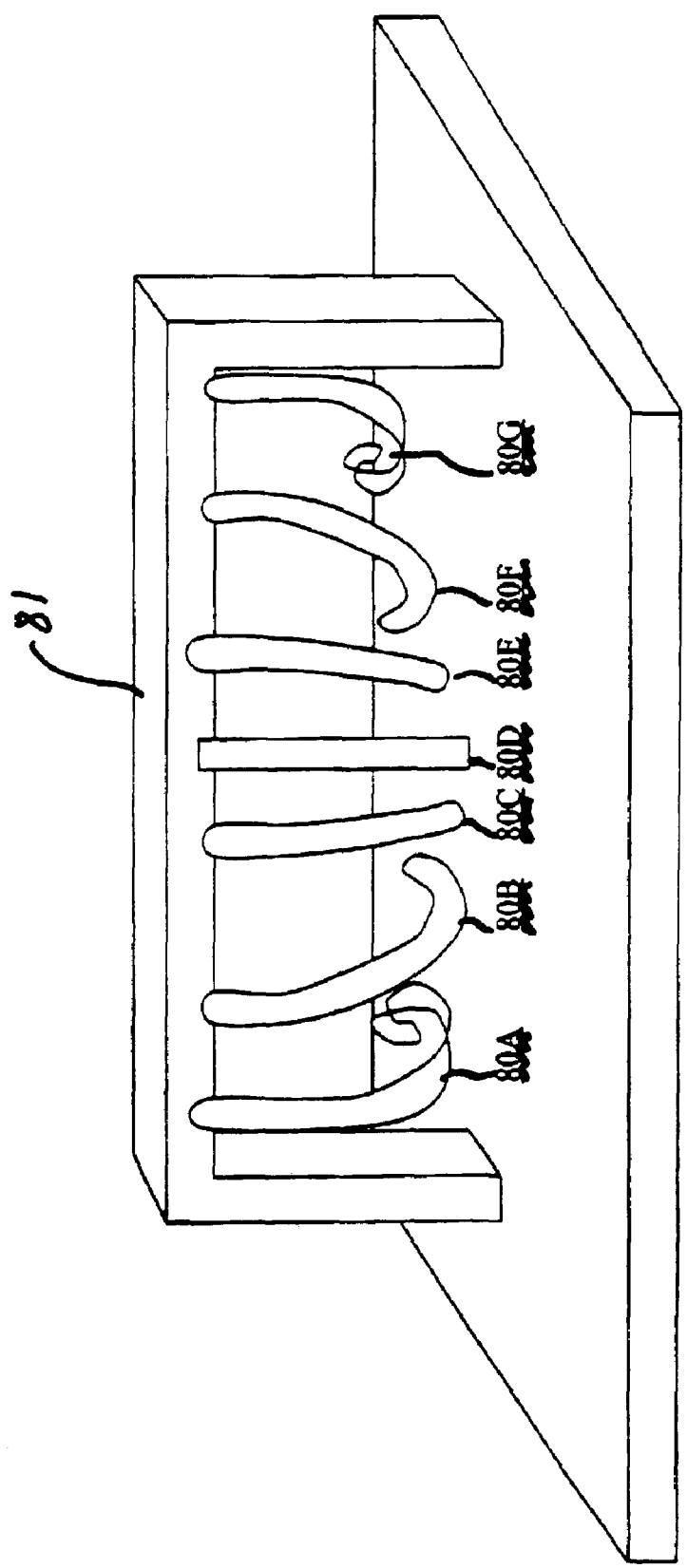

FIG. 8 illustrates a thermometer comprising one or more of strips 80A–80G heat movable plastics suspended from a linear base 81 to hang in a parallel array. The strips are fabricated to curl at respectively different temperatures, e.g. temperatures spaced apart by about 5 degrees Fahrenheit. The strips are advantageously reflective (white or silver) to assure temperature readings are not by absorbed sunlight, and conveniently they are marked (not shown) with the temperature they indicate. Slightly conducting plastics are advantageous for minimizing the effect of static charges. In operation, the temperature can be indicated by the strip hanging vertically, with the remaining strips curled. Any number of strips can be used. A single strip can be used as an indicator of normal room temperature.

B. Non-Scalding Lid

FIGS. 9A and 9B depict a non-scalding lid 91 for a drinking cup 89 comprising a flap 90 of heat movable plastic attached to the lid under a drinking slot 92. The flap materials are chosen and oriented so that the flap closes off the slot 92 at high temperatures capable of scalding. At lower temperatures suitable for drinking, the flap curls away from the slot, permitting drinking. This device is particularly useful as a disposable coffee lid.

C. Heat Indicator for Drinking Cup

FIGS. 10A and 10B show a lid 100 for a drinking cup 101 including a warning flag 102 of heat movable plastic secured on top of the lid. The top of the flag 102 can be white indicating the contents and can be drunk and the bottom or underlying lid can be red with a warning message, e.g. "Too Hot". When the contents of the container are cool enough to drink, the flag lies flat (FIG. 10A). When it is too hot, the flag curls up, exposing the warning message (FIG. 10B).

D. Variable Sunlight Blocker

FIGS. 11A and 11B shows a variable sunlight blocker comprising a sheet 110 of heat movable plastic in the form of louvers 111 adhered to a plane of transparent material such as window glass 112. Advantageously the plastic is coated with light reflective material. Preferably the sheet is placed in the center of a thermoplane window formed with a second glass plane 113. At low temperatures or low sunlight conditions (FIG. 11B), the louvers 111 let sunlight into the house. At higher temperatures (FIG. 11A), the louvers 111 curl and block the light, reducing the heat load on the house.

E. Variable Ventilator

FIGS. 12A and 12B illustrate a variable ventilator comprising a sheet 120 of heat movable plastic cut to define an array of flags 121. The sheet is bonded onto an apertured support sheet 122, such as perforated masonite or flexible plastic, having holes 123 that line up under each flap. Each flap/hole combination forms a valve that lets air pass through at some temperatures and blocks air flow at other temperatures (FIG. 12A).

Such variable ventilators can be used to let air out of an attic in summer but seal it in winter. They can assist temperature regulation in greenhouses and coldframes. And, produced as large areas of clear plastic, they can assist in temperature regulation of entire gardens or even fields. The flaps would let in rain, yet still moderate temperature.

IV. Display Applications

These devices also provide novel and attractive visual displays. For example, the opening pyramid of FIG. 4 can be used as a product display.

Figure 13B:
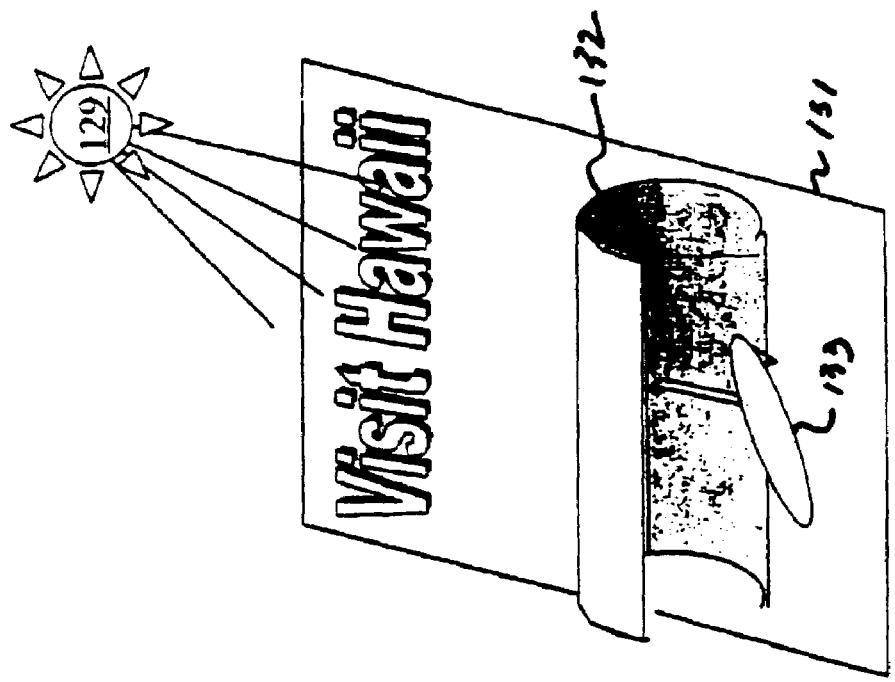
FIG. 13 shows a thermally movable plastic device for advertising display.
Figure 13A:
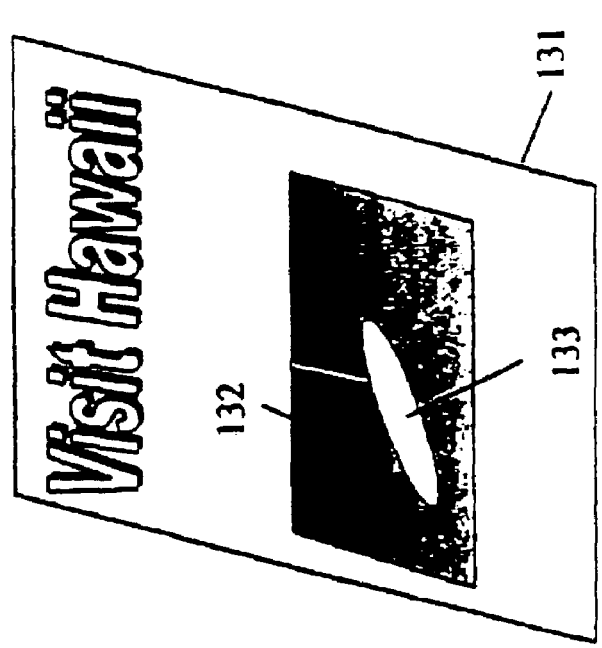

FIGS. 13A and 13B illustrate another display wherein a thermally movable plastic sheet 132 is partially attached to a display board 131 so that upon heating by a heat source 129 it will produce a three-dimensional effect. In the example shown, upon heating the sheet 132 curls like a wave. Light objects such as a simulated surfboard 133 can also be attached to the sheet 132 to enhance the three-dimensional affect.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed is:

1. A device for monitoring or controlling temperature comprising a body of material and a first and second movable member attached to the body, the first and the second movable members each comprising a laminated sheet or strand of at least two polymeric components, the two polymeric components having coefficients of thermal expansion which differ by more than $1 \times 10^{-5}$, wherein the first member is a different polymer fabrication than the second member such that the first and second members curl at respectively different temperatures whereby the device indicates the temperature.

* * * * *

UNITED STATES PATENT AND TRADEMARK OFFICE
CERTIFICATE OF CORRECTION

PATENT NO. : 7,112,362 B2  Page 1 of 1
APPLICATION NO. : 10/378510
DATED : September 26, 2006
INVENTOR(S) : Greg E. Blonder It is certified that error appears in the above-identified patent and that said Letters Patent is hereby corrected as shown below:

On the Title of the patent item [62], please replace the "Related U.S. Application Data" section with the following paragraph:

--Division of application No. 09/934,744, filed on August 22, 2001, now abandoned, which is a division of application No. 09/442,229, filed on November 17, 1999, now abandoned.--

In Column 1, please replace the paragraph beginning at line 4 with the following paragraph:

--This is a divisional of, and claims priority to, U.S. Application No. 09/934,744, by Greg E. Blonder, filed August 22, 2001, entitled "Thermally Movable Plastic Devices And Toys", now abandoned, which is a divisional of, and claims priority to, U.S. Application No. 09/442,229, by Greg E. Blonder, filed November 17, 1999, entitled "Thermally Movable Plastic Devices And Toys", now abandoned. U.S. Application No. 09/934,744 is hereby incorporated by reference herein.--

Signed and Sealed this

Thirty-first Day of July, 2007

JON W. DUDAS
*Director of the United States Patent and Trademark Office*